United States Patent Office 2,723,274
Patented Nov. 8, 1955

2,723,274

UREIDOTRIAZOLES

Donald W. Kaiser, Old Greenwich, and Grace A. Peters, Stamford, Conn., assignors to American Cyanamid Company, New York, N. Y., a corporation of Maine No Drawing. Application March 8, 1954,
Serial No. 414,868

2 Claims. (Cl. 260—308)

The present invention relates to new ureidotriazoles.

These new compounds are the mono and diureidotriazoles which conform to the formula

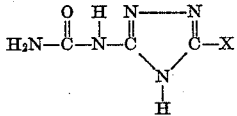

wherein X is either —NH$_2$ or —NHCONH$_2$.

The monoureidotriazole, namely the 3-amino-5-ureido-1,2,4-triazole, may be readily prepared by reacting guanazole with a cyanogen halide in an aqueous alkaline earth metal hydroxide medium maintained at a temperature within the range of from about 0° to 50° C., and preferably in the range of 10° to 30° C.

The diureidotriazole, namely the 3,5-diureido-1,2,4-triazole, may be readily prepared by reacting guanazole with an alkali metal cyanate in an aqueous mineral acid medium maintained at a temperature within the range of from about 10° to 60° C., and preferably in the range of 20° to 40° C. Mineral acids which may be employed in this process are hydrochloric, sulfuric, nitric and phosphoric acid.

The guanazole compound utilized in the preparation of the ureidotriazoles of this invention may be prepared according to methods disclosed in U. S. Patent No. 2,648,671.

The following examples further illustrate the invention:

EXAMPLE 1

*Preparation of 3-amino-5-ureido-1,2,4-triazole*

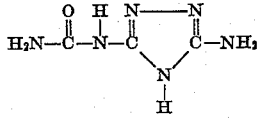

15 cc. (0.3 mole) of liquid cyanogen chloride was allowed to distill into a stirred slurry of 15 g. (0.15 mole) of guanazole and 17 g. (0.3 mole) of calcium oxide in 350 cc. of water maintained between 10° and 20° C. for a period of two hours. The reaction mixture was filtered to remove the precipitated 3-amino-5-ureido-1,2,4-triazole. Recrystallization from water gave 9 g. (42.2% yield) of the colorless crystalline product which melted at 210° C. with decomposition.

EXAMPLE 2

*Preparation of 3,5-diureido-1,2,4-triazole*

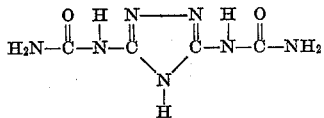

A solution of 16 g. (0.2 mole) of potassium cyanate in 50 cc. of water was added to a solution of 10 g. (0.1 mole) of guanazole and 17 cc. (0.2 mole) of concentrated hydrochloric acid in 100 cc. of water at room temperature. The reaction mixture was stirred for a period of two hours and then filtered to remove the precipitated 3,5-diureido-1,2,4-triazole. 18 g. (97% yield) of the crude product was obtained. After recrystallization from a mixture of water and 2-ethoxyethanol (95 parts of water and 5 parts of 2-ethoxyethanol by volume), the colorless crystalline product melted at 240° C. with decomposition.

The ureidotriazoles of the present invention have valuable and characteristic properties which make them especially suitable for use in industry, for example, the monoureidotriazole possesses herbicidal properties which make it particularly useful in compositions utilized for controlling the growth of vegetation and for the eradication of weeds. Valuable resinous condensation products formed by condensing the diureidotriazole with low molecular weight aliphatic aldehydes such as formaldehyde, paraldehyde, acetaldehyde and butyraldehyde, are especially suitable for use in the manufacture of molded and laminated articles, and for use in coating and adhesive applications. These resinous condensation products are particularly adapted for the manufacture of molded articles which are distinguished by a high degree of resistance toward water and light, and by good electrical insulating power.

While the invention has been described with particular reference to specific embodiments, it is to be understood that it is not to be limited thereto but is to be construed broadly and restricted solely by the scope of the appended claims.

We claim:

1. 3-amino-5-ureido-1,2,4-triazole.
2. The method of preparing 3-amino-5-ureido-1,2,4-triazole which comprises reacting guanazole with cyanogen chloride in an aqueous alkaline earth metal hydroxide medium at a temperature in the range of about 0°–50° C.

No references cited